(12) United States Patent
Deng

(10) Patent No.: US 8,284,266 B2
(45) Date of Patent: Oct. 9, 2012

(54) METHOD AND APPARATUS PROVIDING MOTION SMOOTHING IN A VIDEO STABILIZATION SYSTEM

(75) Inventor: Yining Deng, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 1164 days.

(21) Appl. No.: 12/155,308

(22) Filed: Jun. 2, 2008

(65) Prior Publication Data
US 2009/0295930 A1    Dec. 3, 2009

(51) Int. Cl.
*H04N 5/228* (2006.01)
(52) U.S. Cl. .............. 348/208.99; 348/208.1; 348/208.4
(58) Field of Classification Search .................. None
See application file for complete search history.

(56) References Cited

U.S. PATENT DOCUMENTS

| | | | |
|---|---|---|---|
| 5,805,736 A * | 9/1998 | Kim | ............................... 382/242 |
| 6,809,758 B1 | 10/2004 | Jones | |
| 7,119,837 B2 | 10/2006 | Soupliotis et al. | |
| 7,221,776 B2 | 5/2007 | Xiong | |
| 7,260,271 B2 * | 8/2007 | Funamoto | ...................... 382/275 |
| 2005/0140807 A1 | 6/2005 | Nam | |
| 2005/0185058 A1 | 8/2005 | Sablak | |
| 2005/0201637 A1 * | 9/2005 | Schuler et al. | ................. 382/284 |
| 2005/0275727 A1 | 12/2005 | Lai et al. | |
| 2006/0244836 A1 | 11/2006 | Batur | |
| 2007/0211154 A1 * | 9/2007 | Mahmoud et al. | ............. 348/251 |
| 2009/0219401 A1 * | 9/2009 | Drouot | ........................ 348/208.4 |

FOREIGN PATENT DOCUMENTS

WO    WO 2007/040838 A1    4/2007

OTHER PUBLICATIONS

Chang, Hung-Chang et al., "A Robust and Efficient Video Stabilization Algorithm", 2004 IEEE International Conference on Multimedia and Expo (ICME), pp. 29-32.
Matsushita, Yasuyuki et al., "Full-Frame Video Stabilization", 2005 IEEE Computer Society Conference on Computer Vision and Pattern Recognition, vol. 1, pp. 50-57.

* cited by examiner

*Primary Examiner* — Lin Ye
*Assistant Examiner* — Euel Cowan
(74) *Attorney, Agent, or Firm* — Nancy Y. Ru

(57) ABSTRACT

A method and apparatus for smoothing an image in a plurality of video frames consisting of a current frame and at least one previous frame. The position of at least one pixel in each of the plurality of frames is determined to provide respective determined positions. An adjusted position of the at least one pixel in the current frame is calculated based on the determined positions.

24 Claims, 17 Drawing Sheets

METHOD AND APPARATUS PROVIDING MOTION SMOOTHING IN A VIDEO STABILIZATION SYSTEM

TECHNICAL FIELD

Embodiments described herein relate generally to imaging and more particularly to techniques for smoothing motion to stabilize video images.

BACKGROUND

Conventional video stabilization techniques aim to reduce the jitter associated with a video by enabling the camera to automatically change the angle of its lens or by low-cost post-processing of the captured video. Technology that enables a camera to automatically change the angle of its lens to compensate for jitter is relatively expensive to implement. Thus, post-processing is typically used in cheaper digital video cameras for video stabilization.

In general, post processing for video stabilization works by estimating the motion between consecutive frames and then compensating for unwanted and shaky motion so that the resulting frames follow a smooth trajectory. The purpose of motion filtering is to remove the ups-and-downs in the motion trajectory and plot out positions of video frames had there been no camera shaking. However, conventional post-processing techniques often require a frame buffer for storing the current and future frames of the video, so that the motion between the consecutive frames can be estimated. The inclusion of a frame buffer adds cost to the video camera, yet the conventional post-processing techniques do not work in absence of the frame buffer. Moreover, storing the future frames adds a processing delay of approximately 2-4 frames. At 30 frames-per-second (fps), the delay is approximately 0.1 seconds. Real-time applications, such as e.g., video preview, are negatively affected by such delay.

Thus, systems and methods that are capable of performing motion smoothing in the absence of a frame buffer are needed.

BRIEF DESCRIPTION OF THE DRAWINGS

In the drawings, like reference numbers indicate identical or functionally similar elements. Additionally, the leftmost digit(s) of a reference number identifies the drawing in which the reference number first appears.

DETAILED DESCRIPTION

Although the embodiments described herein refer specifically, and by way of example, to imagers having pixel arrays and components thereof, including image processors, it will be readily apparent to persons skilled in the relevant art(s) that the embodiments are equally applicable to other devices and systems. It will also be readily apparent to persons skilled in the relevant art(s) that the embodiments are applicable to any apparatus or system requiring motion smoothing for video image stabilization.

Embodiments described herein are capable of smoothing motion in video images without the need for a frame buffer. For instance, the smoothing operation may exclude future frames of the video, relying instead on a current frame and at least one previous frame of the video. The smoothing operation may be performed in any of a variety of ways. In a first example, the position of at least one pixel in the current frame is adjusted by combining (e.g., adding) a compensation value with the current position. The compensation value may be the difference between the position of the at least one pixel in the current frame and an average of the positions in the current and previous frames, though the scope of the embodiments described herein are not limited in this respect. The compensation value may be set to a value (e.g., a predetermined value) under designated conditions. The compensation value may be based on any number of the previous frames, and the number may change based on designated conditions.

In a second example, the position of the at least one pixel in the current frame is adjusted by utilizing a polynomial fitting technique. The positions of the at least one pixel in the current and previous frames are represented using respective polynomials having coefficients that can be estimated based on the positions of the at least one pixel in the current and previous frames. The estimated coefficients corresponding to the current frame are used to determine an adjusted position of the at least one pixel in the current frame.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
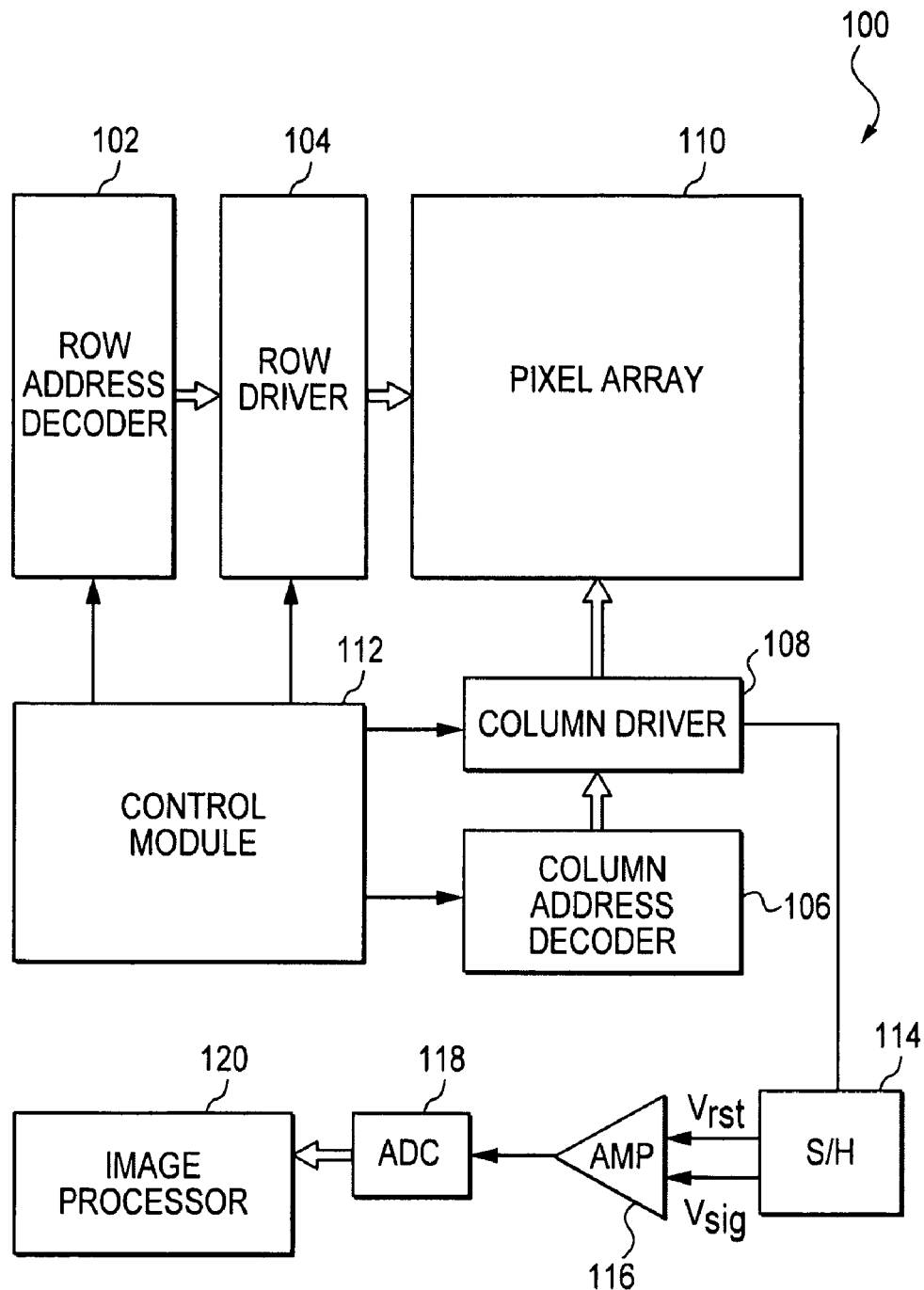
FIG. 1 is an example implementation of an imager.

FIG. 1 is an example implementation of an imager. In FIG. 1, imager 100 is a complementary metal-oxide-semiconductor (CMOS) imager, which includes a pixel array 110 having a plurality of pixels arranged in a predetermined number of columns and rows. The pixels in a given row of pixel array 110 are turned on at the same time by a row select line, and the pixel signals of each column are selectively provided to output lines by column select lines. A plurality of row and column select lines is provided for the entire pixel array 110.

Row driver 104 selectively activates the row lines in response to row address decoder 102. Column driver 108 selectively activates the column select lines in response to column address decoder 106. Thus, a row and column address is provided for each pixel in pixel array 110.

Control module 112 controls row address decoder 102 and column address decoder 106 for selecting the appropriate row and column select lines for pixel readout. Control module 112 further controls row driver 104 and column driver 108, which apply driving voltages to the respective drive transistors of the selected row and column select lines. A sample-and-hold (S/H) circuit 114 associated with column driver 108 reads a pixel reset signal $V_{rst}$ and a pixel image signal $V_{sig}$ for selected pixels. Differential amplifier (amp) 116 generates a differential signal (e.g., $V_{rst}-V_{sig}$) for each pixel. Analog-to-digital converter (ADC) 118 digitizes each of the differential signals, which are provided to image processor 120. Although one S/H circuit 114, differential amplifier 116, and ADC 118 are shown in FIG. 1, which may be selectively coupled to the column lines of pixel array 110, this is merely one representative structure. A S/H circuit 114, differential amplifier 116, and ADC 118 may be provided for each column line of pixel array 110. Other arrangements using S/H circuits 114, differential amplifiers 116, and ADCs 118 for sampling and providing digital output signals for the pixels of array 110 may also be used. Also, although a CMOS imager is illustrated, embodiments described herein can be applied to images captured using any sensor technology, including charge-coupled device (CCD).

Image processor 120 manipulates the digital pixel signals to provide an output image color reproduction represented by the plurality of pixels in pixel array 110. Image processor 120 may perform any of a variety of operations, including but not limited to positional gain adjustment, defect correction, noise reduction, optical crosstalk reduction, demosaicing, resizing, sharpening, etc. Image processor 120 may also perform any of the motion smoothing techniques described herein. Image processor 120 may be on the same chip as imager 100, on a different chip than imager 100, or on a different stand-alone processor that receives image signals from imager 100.

FIGS. 2, 4, 7-10, 12, and 15 are flowcharts of respective methods of smoothing motion in video in accordance with embodiments disclosed herein. The embodiments described herein, however, are not limited to the descriptions provided by the flowcharts. Rather, it will be apparent to persons skilled in the relevant art(s) from the teachings provided herein that other functional flows are within the scope and spirit of the embodiments.

Methods 200, 400, 700-1000, 1200, and 1500 will be described with continued reference to image processor 120 described above in reference to FIG. 1, though the methods are not limited to use with that embodiment.

Figure 2:
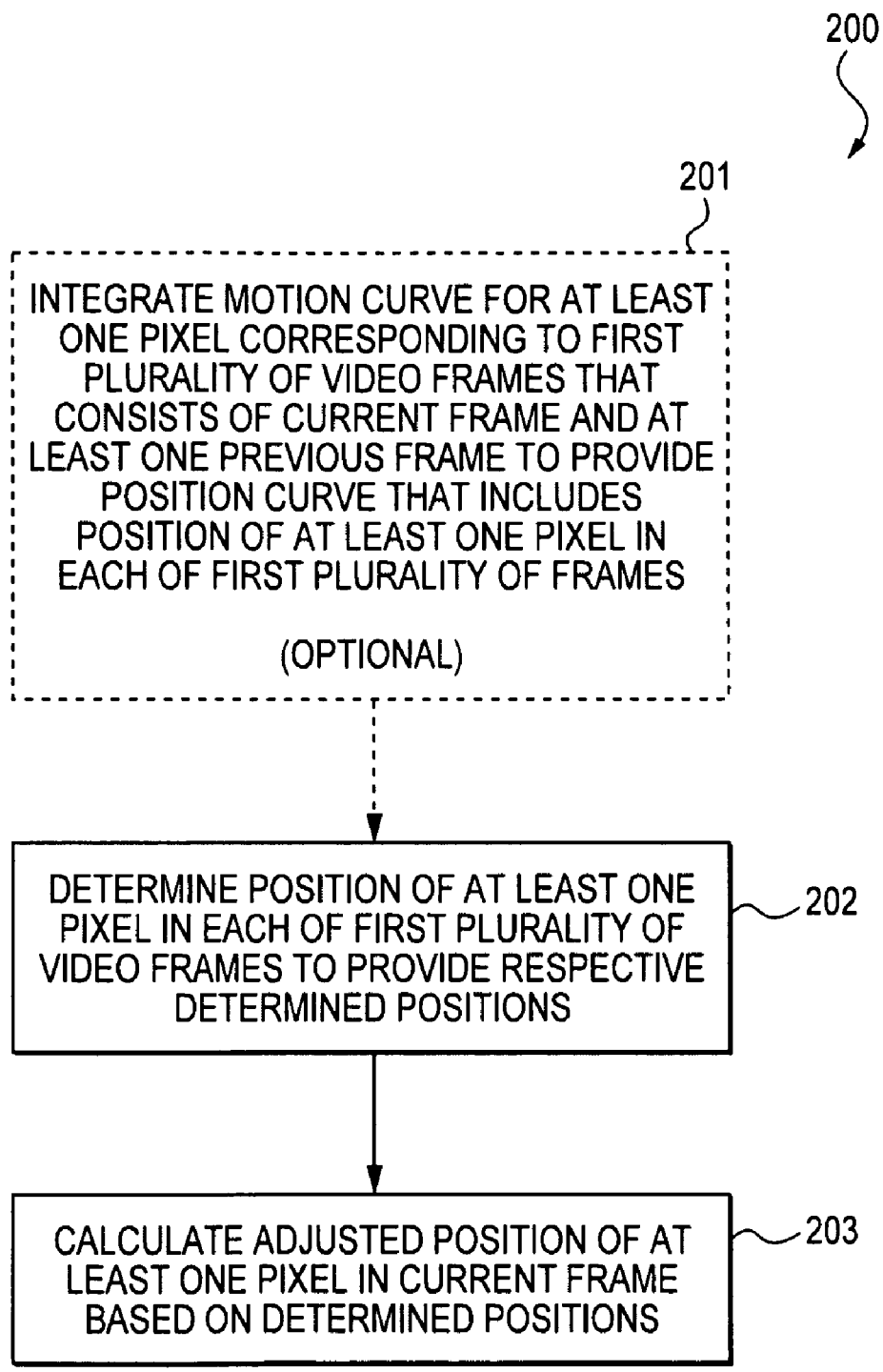
FIGS. 2, 4, 7-10, 12, and 15 are flowcharts of respective methods of smoothing motion in a video in accordance with embodiments disclosed herein.

Referring now to FIG. 2, in method 200, a motion curve for at least one pixel corresponding to a first plurality of video frames is optionally integrated to provide a position curve that includes the position of the at least one pixel in each of the first plurality of frames at block 201. The position curve therefore indicates a respective position of the at least one pixel for each video frame. The first plurality of frames consists of a current frame and at least one previous frame. The first plurality of frames does not include future frames. Thus, a frame buffer is not necessary to store such future frames. The position of the at least one pixel in each of the first plurality of video frames is determined to provide respective determined positions at block 202. The at least one pixel may be a single pixel, a block of pixels, an entire frame of pixels, etc. An adjusted position of the at least one pixel in the current frame is calculated based on the determined positions at block 203.

Technologies for determining the movement of at least one pixel from one frame to another are well known in the relevant art(s). For example, common features, such as corner(s), edge(s), and/or block(s) of pixels, may be detected in each of the frames. The position of these features in the first plurality of video frames may be used to determine the position of the at least one pixel in the current frame on which an adjustment is made. For instance, the position of the at least one pixel in the current frame may be adjusted to more closely match the position of the features as detected among the first plurality of video frames.

The adjusted position of the at least one pixel may be calculated in any of a variety of ways. In a first example embodiment, the position of at least one pixel in the current frame is adjusted by combining (e.g., adding) a compensation value with the current position. The compensation value may be the difference between the position of the at least one pixel in the current frame and an average of the positions in the current and previous frames, though the scope of the embodiments described herein are not limited in this respect.

In a second example embodiment, the position of the at least one pixel in the current frame is adjusted by utilizing a polynomial fitting technique. The positions of the at least one pixel in the current and previous frames are represented using respective polynomials having coefficients that can be estimated based on the positions of the at least one pixel in the current and previous frames. The estimated coefficients corresponding to the current frame are used to determine an adjusted position of the at least one pixel in the current frame.

These example embodiments are described in greater detail below with reference to FIGS. 4-15. Although the shaking of a video camera may cause jitter in any one or more of the X, Y, and Z directions, the following discussion is provided with reference to a single direction for ease of discussion. The discussion therefore assumes that the jitter associated with the respective X, Y, and Z directions is un-correlated. However, the embodiments disclosed herein are not intended to be limited in this respect. While the motion smoothing techniques that are independently applied to one direction may be independently applied to the other respective directions, persons skilled in the relevant art(s) will recognize that the global motion and/or the motion associated with camera shaking may, in fact, be correlated. The embodiments disclosed herein are capable of smoothing motion in frames having jitter that is correlated in two or more of the X, Y, and Z directions.

If the number of pixels in the pixel array that is used for motion smoothing is the same as the number of pixels in each video frame, any shifting of the video frames based on motion smoothing results in blank spaces (i.e., clipping) at the edge(s) of the frames. The output frames may be cropped to avoid introducing such blank spaces. To provide a given output video size without any blank space in the video, the maximum amount of compensation (i.e., adjustment) may be limited.

Figure 3:
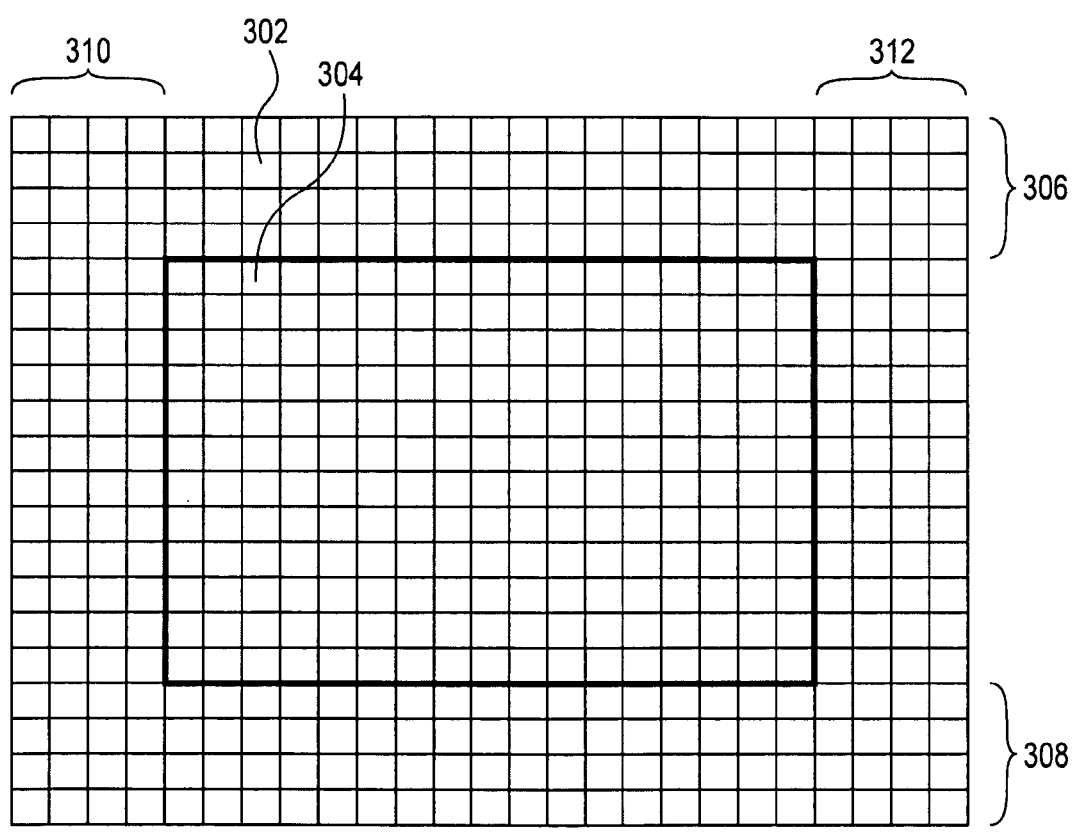
FIG. 3 shows a frame of video having buffer signals along its edges in accordance with an embodiment disclosed herein.

As shown in FIG. 3, buffer pixels 302 may be provided along the edge(s) of a frame 304 to accommodate a difference between the determined position and the adjusted position of the at least one pixel in the frame 304. In FIG. 3, the buffer pixels 302 are arranged in four rows 306 along the top of the frame 304, four rows 308 along the bottom, and four columns 310, 312 on each of the right and left sides to form a border surrounding the perimeter of the frame 304. The configuration in FIG. 3 provides a maximum compensation of four pixels in each of the positive and negative X directions and four pixels in each of the positive and negative Y directions for illustrative purposes and is not intended to be limiting. The border may include any number of rows and/or columns of buffer pixels, and it is not necessary that the rows or columns include the same number of pixels. Likewise, the illustrated pixel frame 304 may include any number of pixels.

Figure 4:
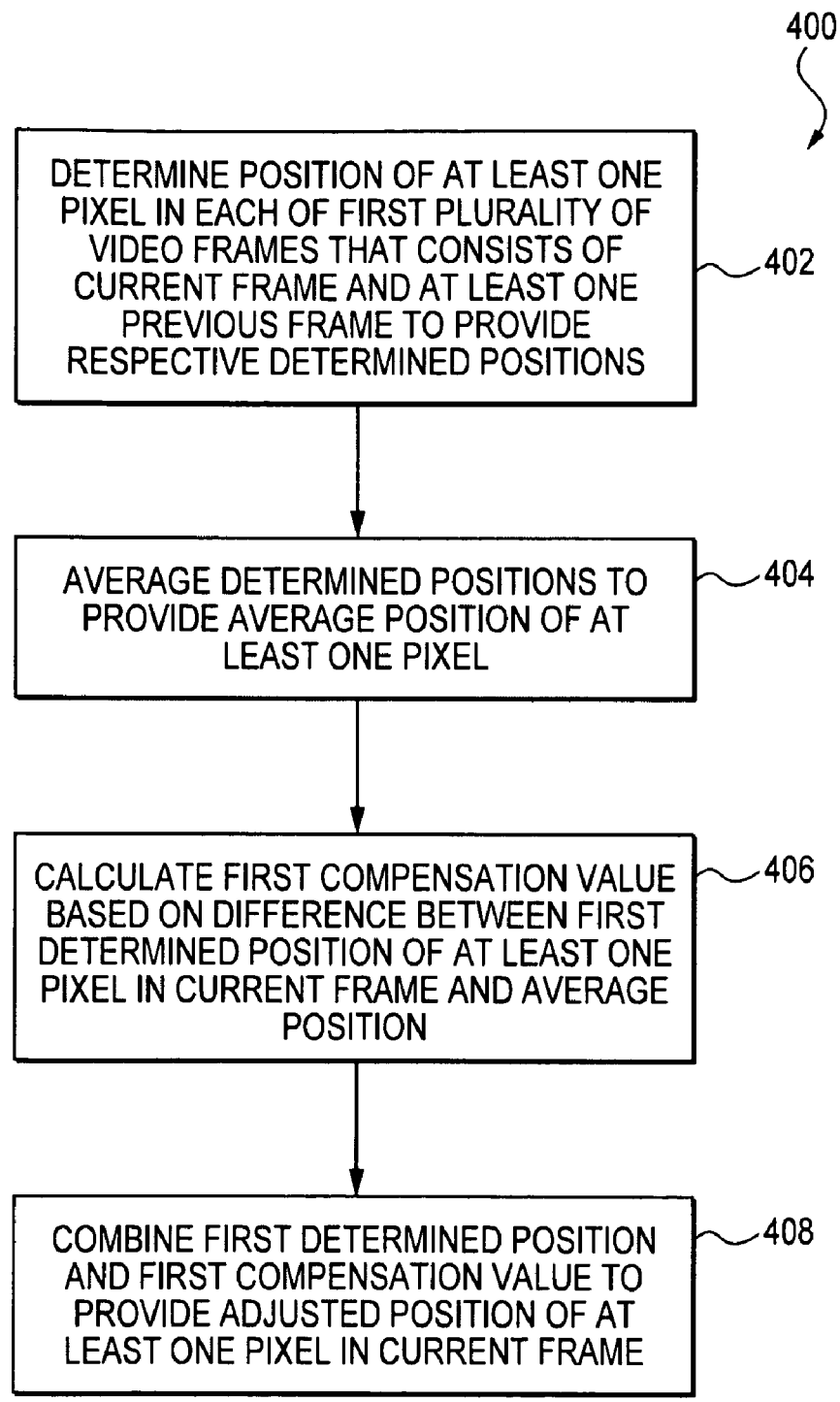

The first example embodiment, in which the position of the at least one pixel in the current frame is adjusted by combining a compensation value with the current position, is illustrated in greater detail in FIG. 4. A position of the at least one pixel in each of the first plurality of video frames is determined to provide respective determined positions at block 402. The determined positions are averaged to provide an average position of the at least one pixel at block 404. A first compensation value is calculated based on a difference between a first determined position of the at least one pixel in the current frame and the average position at block 406. For instance, image processor 120 may subtract the first determined position from the average position (or vice versa) to provide the first compensation value.

Persons skilled in the relevant art(s) will recognize that well known motion detection technologies exist for determining the movement and position within a frame of at least one pixel from one frame to another and may be utilized for determining the difference between the first determined position of the at least one pixel in the current frame and the average position from prior frames. For instance, the average position of detected features in the first plurality of video frames may indicate the average position of the at least one pixel. The difference between the first determined position of the at least one pixel in the current frame and the average position indicates the first compensation value.

The first determined position and the first compensation value are combined to provide the adjusted position at block 408. For instance, image processor 120 may add the first determined position and the first compensation value (or subtract the first compensation value from the first determined position) to provide the adjusted position.

Performing the method 400 illustrated in FIG. 4 upon successive frames of the video provides a delayed smoothed position curve. Thus, the first example embodiment may be used in the absence of a frame buffer when a delay is allowed, for example. The delayed smoothed position curve is subject to clipping, as described above with reference to FIG. 3.

Figure 5:
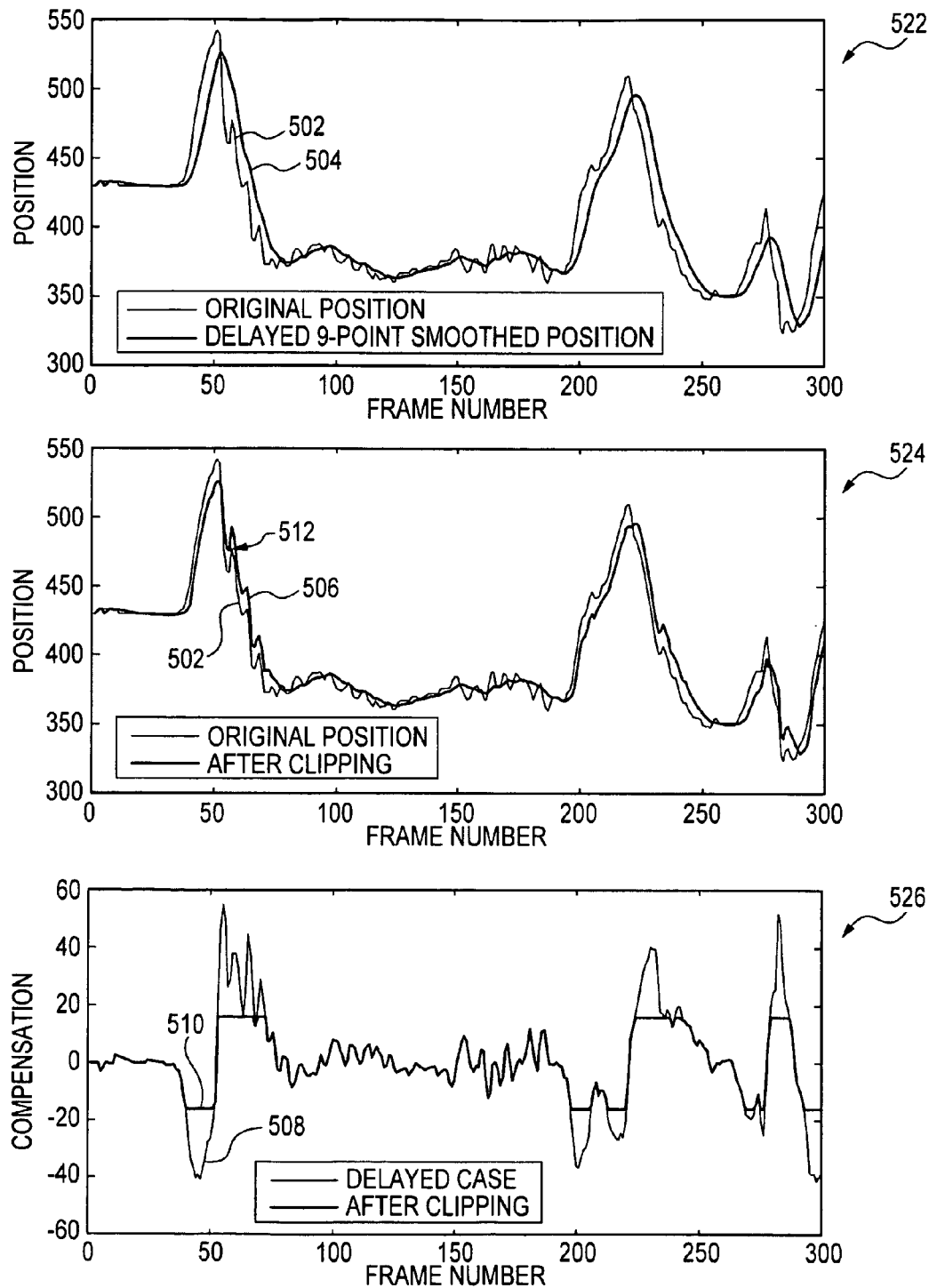
FIG. 5 illustrates the effect of clipping in accordance with an embodiment disclosed herein.

FIG. 5 illustrates the effect of clipping on the first example embodiment in accordance with an embodiment disclosed herein. In FIG. 5, the X-axis represents consecutively numbered frames in a plurality of video frames. In graphs 522 and 524, the Y-axis represents the position of at least one pixel in each respective video frame. In graph 526, the Y-axis represents the compensation calculated for each respective video frame. In graph 522, curve 502 represents the original position curve before smoothing. Curve 504 represents the delayed smoothed position curve without imposing any limit on the compensation values. Curve 506 of graph 524, on the other hand, represents the delayed smoothed position curve with a maximum compensation of sixteen pixels for illustrative purposes. The delayed smoothed position curves 504 and 506 are generated using nine points (i.e., positions in nine respective frames) with four points of delay. As shown in FIG. 5, clipping does not affect most portions of curve 506. However, curve 506 is not smooth in positions corresponding to sharp transitions (e.g., position 512) of the original curve 502.

In graph 526, curve 508 represents the compensation curve without imposing any limit on the compensation values. Curve 510, on the other hand, represents the compensation curve with the compensation limit of sixteen pixels imposed, meaning that the difference between the determined position and the adjusted position of the at least one pixel in a given frame is restricted to a value no greater than sixteen to avoid introducing a blank area into the frame. The effect of clipping may be mitigated in any of a variety of ways. For example, the compensation value associated with a frame may be set to zero if the difference between the average position of the at least one pixel and the determined position of the at least one pixel in the frame exceeds a threshold. It may also be said that the position in the delayed smoothed position curve 506 for a frame defaults to the corresponding position for that frame in the original curve 502 if the threshold is exceeded. For instance, in FIG. 5, if the compensation value associated with a frame exceeds the 16-pixel compensation limit, the compensation value may be set to zero for that frame.

Figure 6:
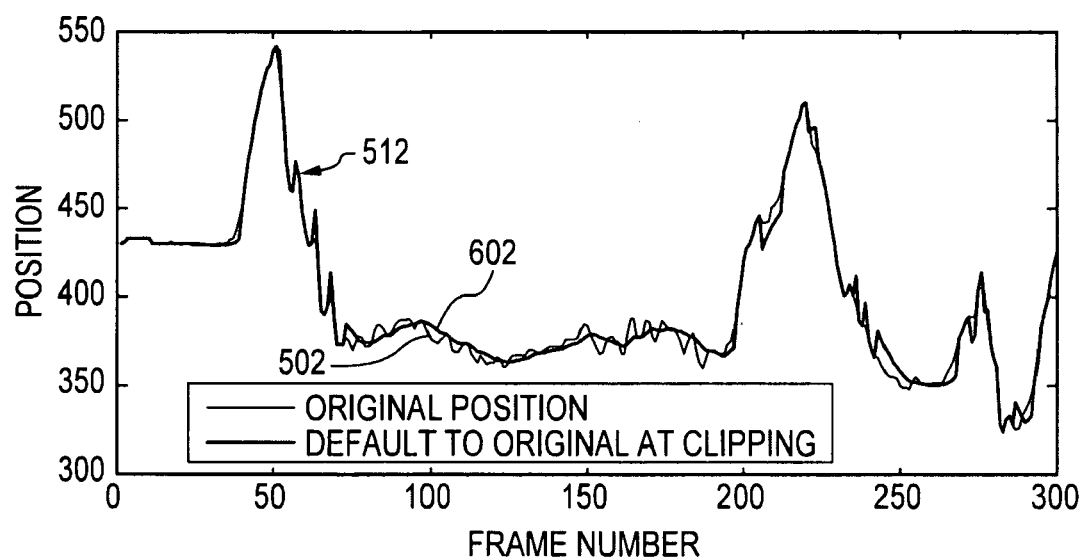
FIG. 6 shows an example delayed smoothed position curve that defaults to the original curve at sharp transitions in accordance with an embodiment disclosed herein.

Clipping indicates that the associated jitter is more likely indicative of a panning of the video camera, rather than the shaking of a user's hand. Thus, it may be preferable to not compensate at all when clipping occurs. FIG. 6 shows an example delayed smoothed position curve 602 that defaults to the original curve at sharp transitions (e.g., position 512) in accordance with an embodiment disclosed herein. In particular, curve 602 has the compensation value set to zero for frames for which the difference between the average position and the determined position of the at least one pixel in that frame exceeds the 16-pixel maximum compensation mentioned above. In FIG. 6, a sharp transition occurs when the difference between the average position and the determined position of the at least one pixel in a frame exceeds the maximum compensation available for that frame. However, persons skilled in the relevant art(s) will recognize that a sharp transition may be defined differently.

Figure 7:
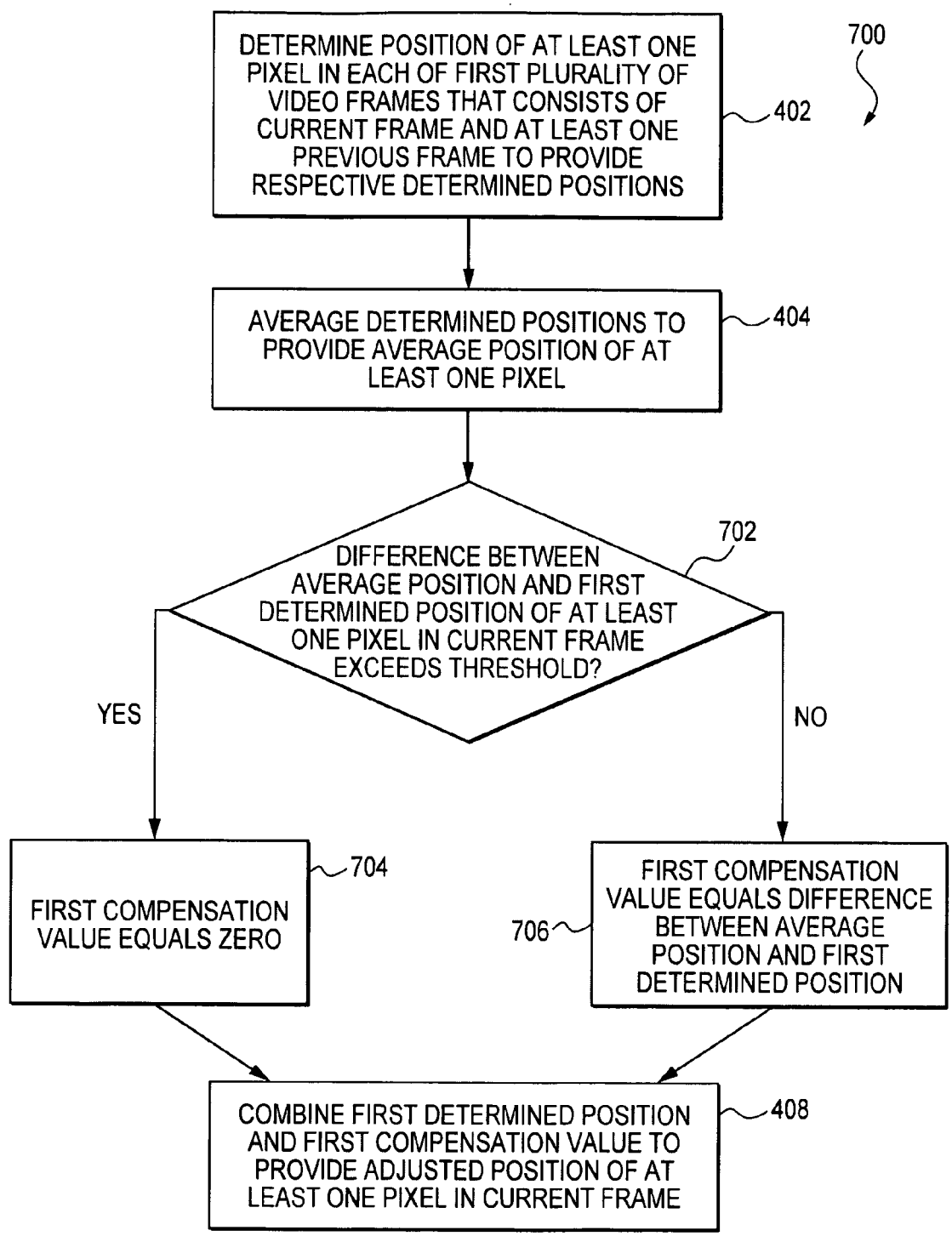

FIG. 7 is a flowchart of an example method 700 in which an adjusted position for a frame is capable of defaulting to the determined position for the frame in accordance with an embodiment disclosed herein. In FIG. 7, a position of at least one pixel in each of a first plurality of video frames is determined to provide respective determined positions at block 402. The first plurality of frames consists of a current frame and at least one previous frame. The determined positions are averaged to provide an average position of the at least one pixel at block 404. If the difference between the average position and the first determined position of the at least one pixel in the current frame exceeds a threshold, as determined at decision block 702, then the first compensation value equals zero at block 704. For instance, image processor 120 may set the first compensation value to be zero. On the other hand, if the difference does not exceed the threshold, as determined at decision block 702, then the first compensation value equals the difference between the average position and the first determined position at block 706. For instance, image processor 120 may set the compensation value to be the difference between the average position and the first determined position. At block 408, the first determined position and the first compensation value are combined to provide an adjusted position of the at least one pixel in the current frame.

Switching between the delayed smoothed position curve 602 and the original curve 502, as described above with reference to FIGS. 6 and 7, may cause undesired artifacts that look like jitter, due to discrepancies between the curves 502 and 602 at those locations. An alternative transition approach may be employed to avoid such artificial jitter. In particular, fewer points may be used to provide an average position of the at least one pixel when clipping occurs. Averaging with fewer points may reduce a delay associated with the motion smoothing technique, may provide an average position that is closer to the original position, and/or may provide less dramatic transitions between frames of the video.

Figure 8:
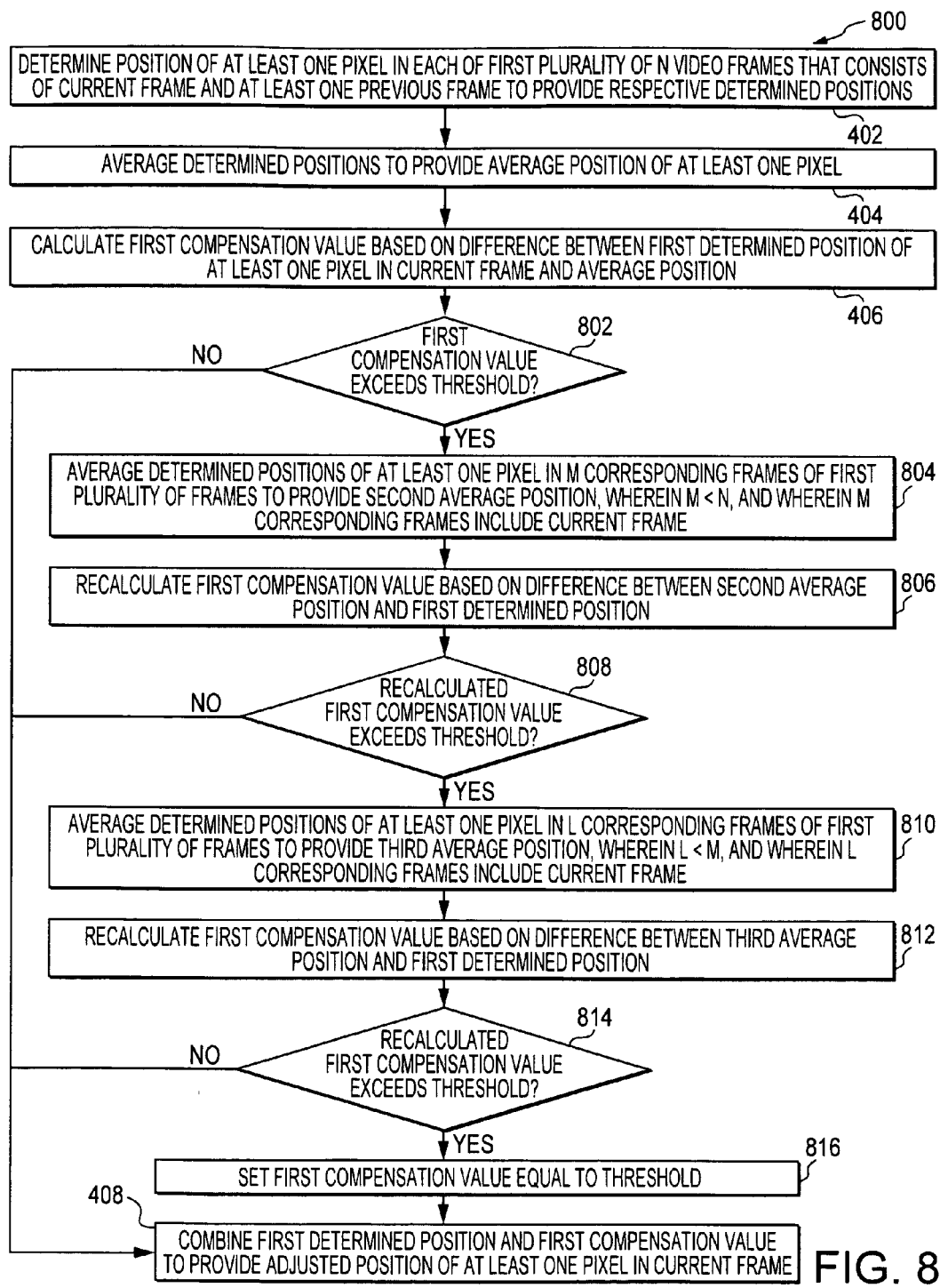

FIG. 8 illustrates an example method 800 in which the number of frames employed to determine the average value of the at least one pixel is reduced in response to the calculated compensation value exceeding a threshold. At block 402, the position of the at least one pixel in each of a first plurality of N video frames is determined to provide respective determined positions. The first plurality of N frames consists of a current frame and at least one previous frame. The determined positions are averaged to provide an average position of the at least one pixel at block 404.

A first compensation value is calculated based on a difference between a first determined position of the at least one pixel in the current frame and the average position at block 406. If the first compensation value does not exceed a threshold, as determined at decision block 802, then control proceeds to block 408. It is not necessary to recalculate the average value using fewer frames if the first compensation value does not exceed the threshold. On the other hand, if the first compensation value exceeds the threshold, as determined at decision block 802, then the determined positions of the at least one pixel in M corresponding frames of the first plurality of frames are averaged to provide a second average position at block 804. M is less than N, and the M corresponding frames include the current frame. Fewer frames are used to calculate the second average position than are used to calculate the first average position in an attempt to avoid blank areas in the frame, for example. The variables M and N may be any respective values, so long as M<N. In this example, M may be 7 and N may be 9 for illustrative purposes. The example values provided herein are not intended to be limiting.

At block 806, the first compensation value is recalculated based on the difference between the second average position and the first determined position. If the recalculated first compensation value does not exceed the threshold, as determined at decision block 808, then control proceeds to block 408. Again, it is not necessary to recalculate the average value using fewer frames if the initially calculated first compensation value does not exceed the threshold. On the other hand, if the recalculated first compensation value exceeds the threshold, as determined at decision block 808, then the determined positions of the at least one pixel in L corresponding frames of the first plurality of frames are averaged to provide a third average position at block 810. L is less than M, and the L corresponding frames include the current frame. Thus, fewer frames are used to calculate the third average position than are used to calculate the second average value. The variable L may be any value, so long as L<M. In this example, L may be 5 for illustrative purposes and is not intended to be limiting.

At block 812, the first compensation value is recalculated based on the difference between the third average position and the first determined position. If the recalculated first compensation value does not exceed the threshold, as determined at decision block 814, then control proceeds to block 408. On the other hand, if the recalculated first compensation value exceeds the threshold, as determined at decision block 814, then the first compensation value is set equal to the threshold at block 816. Setting the first compensation value equal to the threshold provides the greatest compensation value available without causing blank areas to appear in the frame. In other words, a compensation value greater than the threshold would cause the position of the at least one pixel to shift by a number of pixels that is greater than the number of buffer pixels available at the edge of the frame.

At block 408, the first determined position and the first compensation value are combined to provide the adjusted position of the at least one pixel in the current frame.

The method 800 illustrated in FIG. 8 may ensure that the buffer pixels provided at the edges of the current frame are capable of accommodating any difference between the determined position of the at least one pixel and the adjusted position thereof by setting the first compensation value accordingly. Once the number of frames used to determine the average value of the at least one pixel is reduced for calculating the adjusted position in the current frame, the number of frames used to determine the average value for subsequent frames may be increased under designated conditions (e.g., if clipping is longer occurring).

Figure 9:
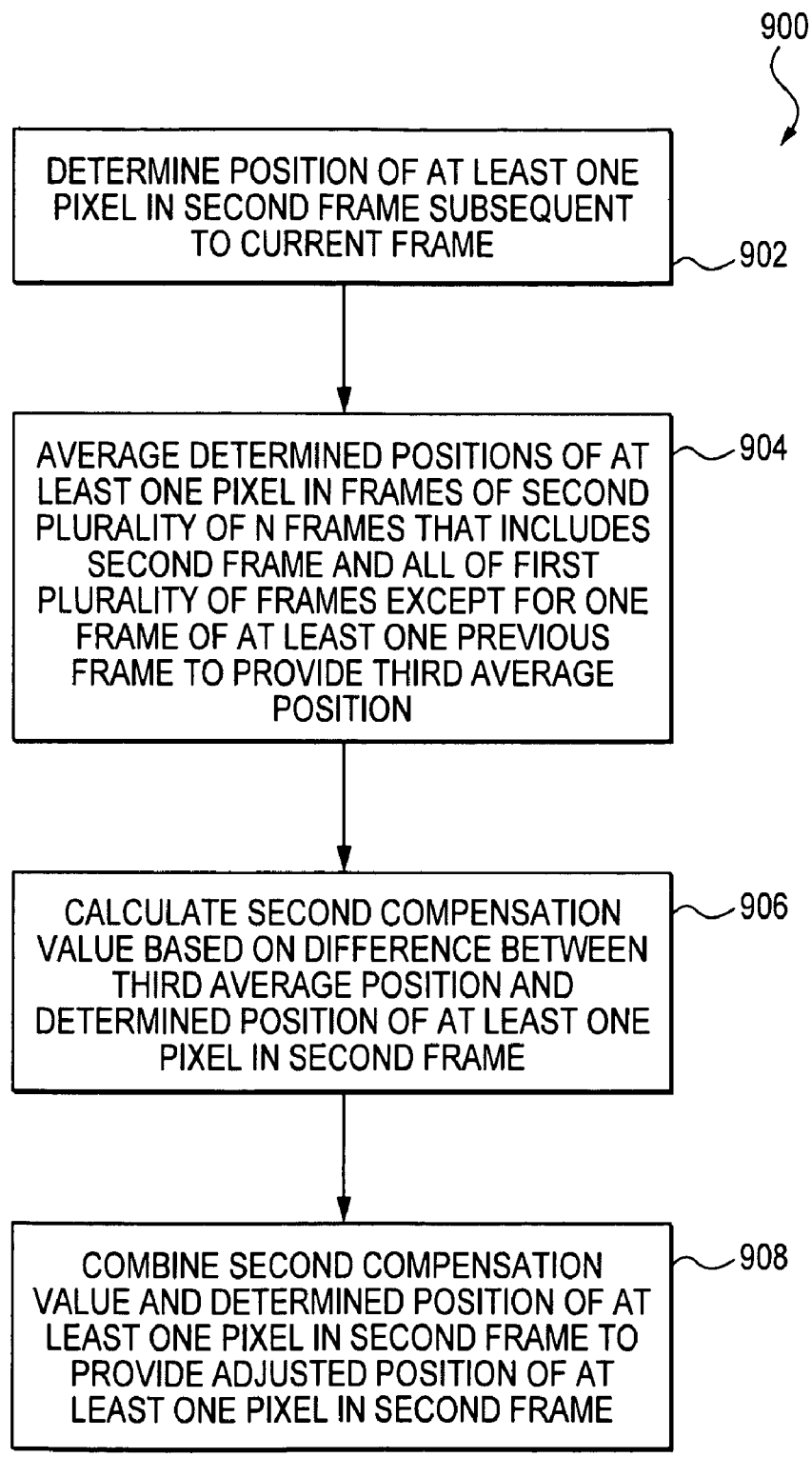

FIG. 9 illustrates a method 900 in which the number of frames used to calculate the average value is increased from M to N frames. For instance, M frames may have been used to calculate the second average position for the current frame, as described above with reference to block 804 (FIG. 8). After combining the first determined position with the first compensation value at block 408 (FIG. 8), the adjusted position of the at least one pixel for a subsequent frame may be based on an average position of the at least one pixel in N frames if the designated conditions are satisfied.

Referring to FIG. 9, according to method 900, the position of at the least one pixel in a second frame that is subsequent to the current frame is determined at block 902. The determined positions of the at least one pixel in frames of a second plurality of N frames are averaged to provide a third average position at block 904. The second plurality of N frames includes the second frame and all of the first plurality of frames except for one frame of the at least one previous frame. For instance, the second plurality of N frames may be offset from the first plurality of N frames by one frame, such that the second plurality is the same as the first plurality except that the second plurality includes the second frame and excludes the oldest frame of the first plurality.

At block 906, a second compensation value is calculated based on the difference between the third average position and the determined position of the at least one pixel in the second frame. The second compensation value and the determined position of the at least one pixel in the second frame are combined to provide an adjusted position of the at least one pixel in the second frame at block 908.

It should be noted that the combining operation of block 908 is performed in response to designated conditions being satisfied. Otherwise, the adjusted position of the at least one pixel in the second frame is based on an average position in a plurality of M frames that includes the second frame, or a plurality of L frames that includes the second frame if using the plurality of M frames leads to clipping. If using the plurality of L frames leads to clipping, the second compensation value is set to be equal to the threshold.

As an example, the designated conditions may require that the absolute value of the second compensation value does not exceed a threshold (e.g., a maximum compensation) and that the absolute value of the second compensation value does not exceed an absolute value of the first compensation value. In effect, the long-term average (based on N frames) must catch up with the short-term average (based on M frames) before the long-term average may be utilized to calculate the adjusted position of the at least one pixel in a frame. For instance, this technique may reduce artificial jitter.

Figure 10:
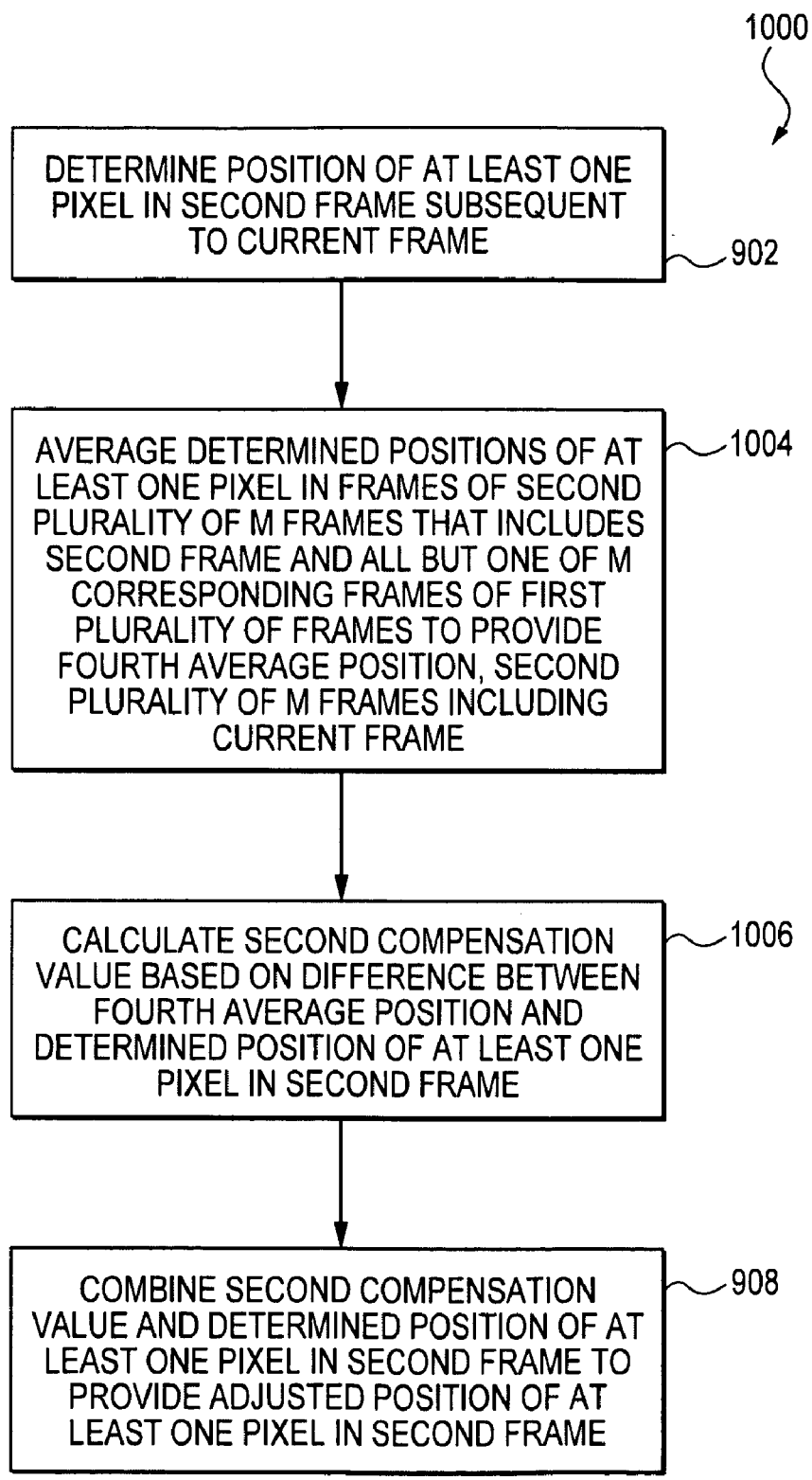

FIG. 10 illustrates a method 1000 in which the number of frames used to calculate the average value is increased from L to M frames. For instance, L frames may have been used to calculate the third average position for the current frame, as described above with reference to block 810 (FIG. 8). After combining the first determined position with the first compensation value at block 408 (FIG. 8), the adjusted position of the at least one pixel for a subsequent frame may be based on an average position of the at least one pixel in M frames if the designated conditions are satisfied.

Referring to FIG. 10, according to method 1000, the position of the at least one pixel in a second frame that is subsequent to the current frame is determined at block 902. The determined positions of the at least one pixel in frames of a second plurality of M frames are averaged to provide a fourth average position at block 1004. The second plurality of M frames includes the second frame and all but one of the M corresponding frames of the first plurality of frames. For instance, the second plurality of M frames may be offset from the M corresponding frames of the first plurality of frames by one frame, such that the second plurality of M frames is the same as the M corresponding frames of the first plurality of frames except that the second plurality of M frames includes the second frame and excludes the oldest frame of the corresponding M frames of the first plurality of frames.

At block 1006, a second compensation value is calculated based on the difference between the fourth average position and the determined position of the at least one pixel in the second frame. The second compensation value and the determined position of the at least one pixel in the second frame are combined to provide an adjusted position of the at least one pixel in the second frame at block 908.

The combining operation of block 908 is performed in response to designated conditions being satisfied. Otherwise, the adjusted position of the at least one pixel in the second frame is based on an average position in a plurality of L frames that includes the second frame. If using the plurality of L frames leads to clipping, the second compensation value is set equal to the threshold.

Figure 11:
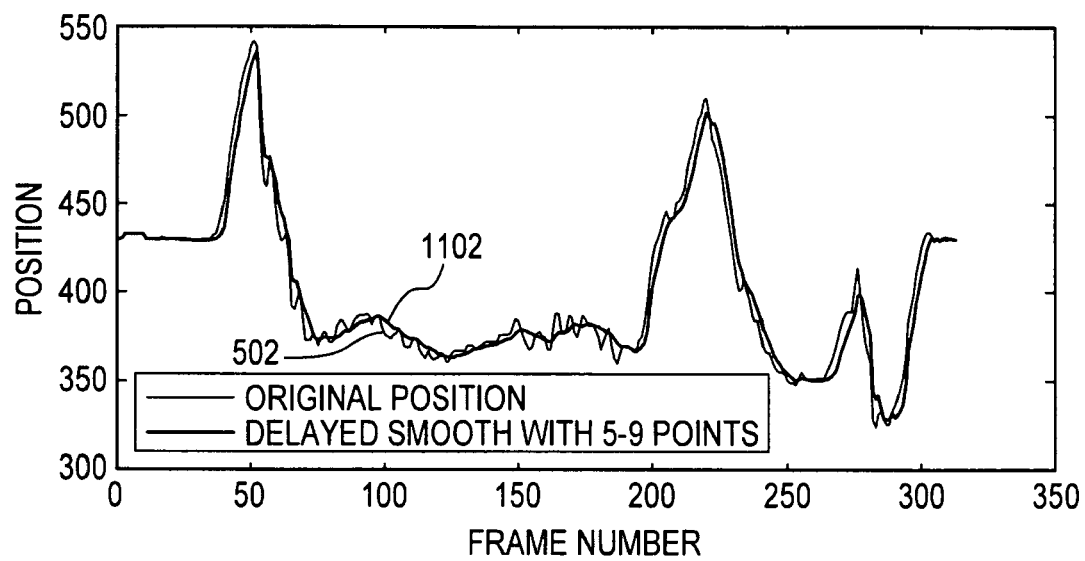
FIG. 11 shows an example delayed smoothed position curve for which the number of frames used to determine the average value for each respective frame is set in accordance with the methods illustrated in FIGS. 8-10.

FIG. 11 illustrates an example delayed smoothed position curve 1102 for which the number of frames used to determine the average value for each respective frame is set in accordance with the methods 800, 900, 1000 illustrated in FIGS. 8-10. Curve 502 represents the original curve before smoothing. In FIG. 11, N=9, M=7, and L=5 for illustrative purposes and is not intended to be limiting. Persons skilled in the relevant art(s) will recognize that N, M, and L may be set to any respective values, so long as N>M>L. Curve 1102 shows a reduced jitter associated with camera shaking and a reduced clipping artifact, as compared to delayed smoothed position curves 506 and 602 of respective FIGS. 5 and 6.

The first example embodiment and example variations set forth above provide relatively smooth transitions between respective positions of at least one pixel in adjacent video frames. For instance, if a person who is recording video does not maintain the recording device (e.g., a digital video recorder) in a motionless state, the motion may cause jitter between the adjacent frames. Thus, the person's shaking hand, for example, may cause the recorded video to have artifacts that are perceived as blurriness in the video. The first example embodiment may be capable of mitigating such artifacts by compensating for the motion that is imposed by the person recording the video.

Figure 12:
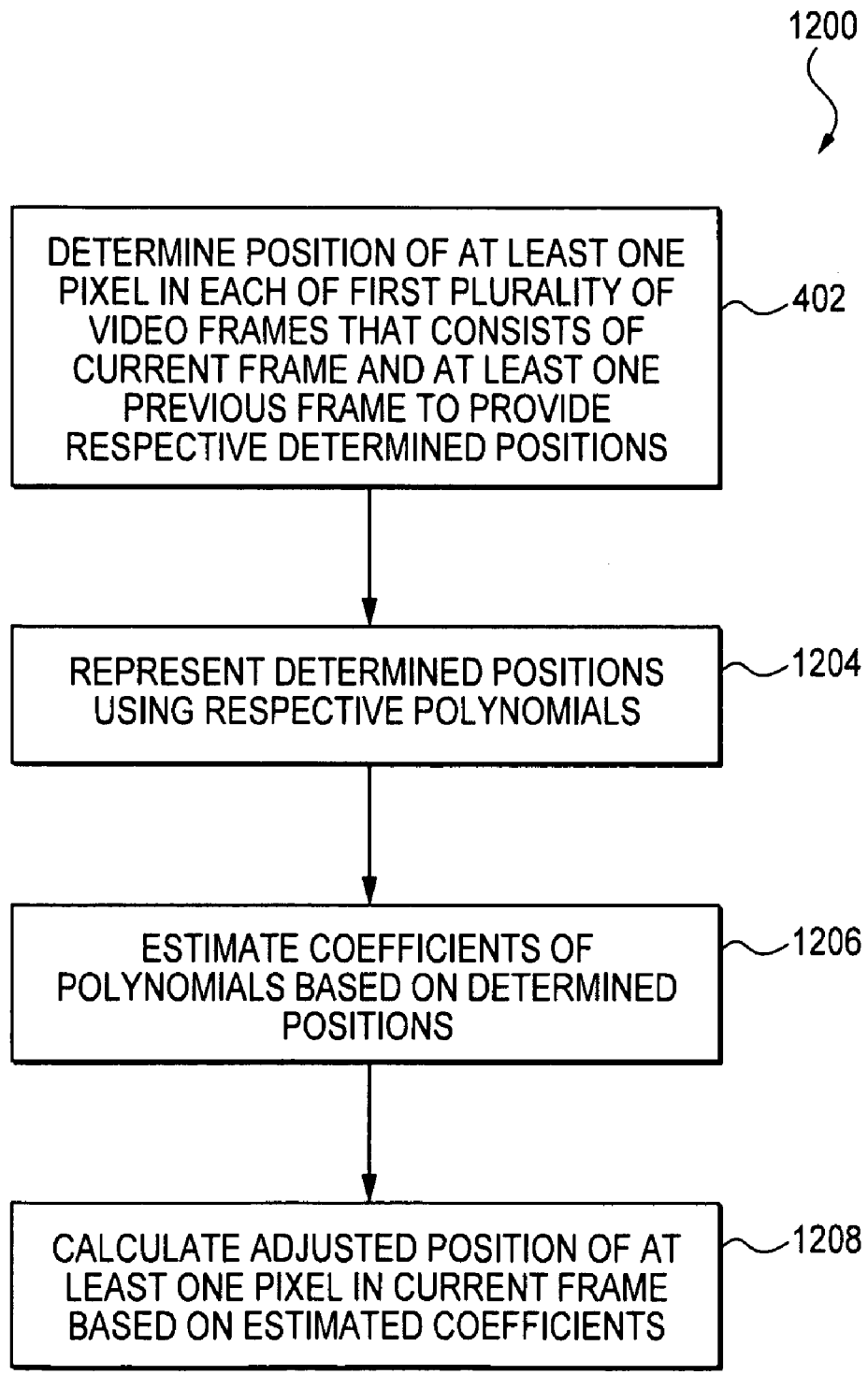

A method 1200 in accordance with the second example embodiment, in which the position of the at least one pixel in the current frame is adjusted by utilizing a polynomial fitting technique, is illustrated in FIG. 12. Polynomial fitting assumes that for any given period of time a corresponding position curve can be represented by a polynomial curve, which estimates the position curve. For example, the curve may include N+1 points (i.e., positions in N+1 respective frames) denoted as $x_0, x_1, x_2, \ldots, x_N$. For a polynomial of order M, the positions of the at least one pixel in the respective frames may be defined by the following equation:

$$x_i = \sum_{j=0}^{M} a_j i^j \qquad \text{(Equation 1)}$$

where $a_j$ represents a polynomial coefficient.

When the order M=1, Equation 1 reduces to a linear fitting. However, the order M of the polynomials may be any value, including but not limited to 1, 2, 3, 4, etc. Polynomial fitting can be solved by any of a variety of fitting techniques. For example, a least squares fit may be obtained using the following matrix equation, which sets the coordinates of the positions $x_0, x_1, x_2, \ldots, x_N$ to be 0, 1, 2, \ldots, N, respectively, for illustrative purposes:

$$\begin{bmatrix} x_0 \\ x_1 \\ \vdots \\ x_N \end{bmatrix} = \begin{bmatrix} 0^0 & 0^1 & \ldots & 0^M \\ 1^0 & 1^1 & \ldots & 1^M \\ \vdots & \vdots & \vdots & \vdots \\ N^0 & N^1 & \ldots & N^M \end{bmatrix} \begin{bmatrix} a_0 \\ a_1 \\ \vdots \\ a_m \end{bmatrix} \qquad \text{(Equation 2)}$$

Persons skilled in the relevant art(s) will recognize that the coordinates of the positions may be any respective values.

Referring to FIG. 12, according to method 1200, the position of the at least one pixel in each of a first plurality of video frames is determined to provide respective determined positions at block 402. The first plurality of frames consists of a current frame and at least one previous frame. The determined positions are represented using respective polynomials at block 1204. For example, in Equation 2, the determined position $x_0$ is represented using the polynomial $x_0 = 0^0 a_0 + 0^1 a_1 + \ldots + 0^M a_M$. The determined position $x_1$ is represented using the polynomial $x_1 = 1^0 a_0 + 1^1 a_1 + \ldots + 1^M a_M$, and so on.

At block 1206, the coefficients of the polynomials are estimated based on the determined positions. Referring to the example of Equation 2, the coefficients $a_0, a_1, \ldots, a_M$ are estimated based on the determined positions $x_0, x_1, \ldots, x_N$, which are known. It should be noted that the values in the second set of brackets in Equation 2 are also known, which enables the coefficients $a_0, a_1, \ldots, a_M$ to be estimated by using well known linear algebra techniques.

At block 1208, an adjusted position of the at least one pixel in the current frame is calculated based on the estimated coefficients. For instance, in the example of Equation 2, assuming that $x_0$ is the position of the at least one pixel in the current frame, $x_0$ may be calculated using the equation $x_0 = 0^0 a_0 + 0^1 a_1 + \ldots + 0^M a_M$.

Performing the method 1200 illustrated in FIG. 12 on successive video frames provides a polynomial fitted position curve, including adjusted positions that are predicted from current and previous positions. For instance, the second example embodiment may be used in the absence of a frame buffer when a delay is not allowed. The polynomial fitted position curve is subject to clipping, as described above with reference to FIG. 3. The adjusted position of the at least one pixel may be limited accordingly to ensure that the polynomial fitting technique does not introduce blank areas at the edge(s) of the frames.

Figure 13:
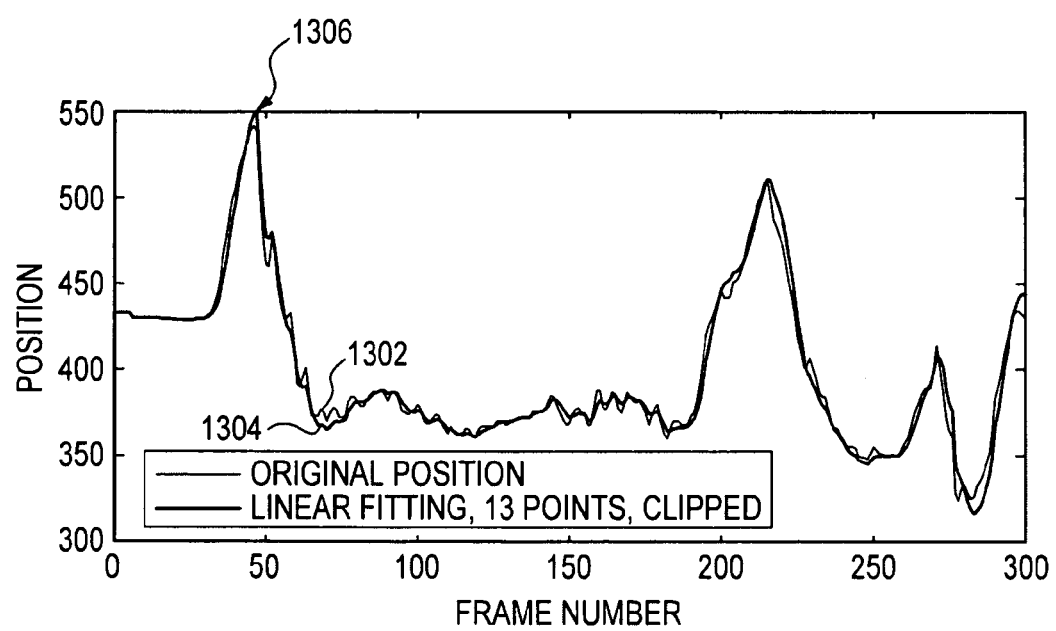
FIG. 13 shows an example curve that is polynomial fitted to positions in respective frames in accordance with the method illustrated in FIG. 12.

FIG. 13 shows an example curve 1304 that is polynomial fitted to positions in respective frames in accordance with the method 1200 illustrated in FIG. 12. Curve 1302 represents the original position curve before smoothing. In FIG. 13, M=1 and N=12 for illustrative purposes. Thus, FIG. 13 shows the result of linear fitting using thirteen points to estimate the coefficients for the linear polynomials. A maximum compensation of sixteen pixels is imposed for purposes of illustration, though the maximum compensation may be set to any value. It should be noted that a maximum compensation need not necessarily be imposed.

As shown at position 1306 in FIG. 13, linear fitting tends to overshoot when there is a sudden change in direction. This problem may be solved by limiting the adjusted position of the at least one pixel in a frame within a range defined by the determined positions of the at least one pixel in the first plurality of frames. Thus, if the determined positions in the respective frames fall within a range from 4 to 11, for example, an adjusted position that is calculated to be greater than 11 will be set to 11. The adjusted position is not allowed to exceed the upper limit of the range, which is 11 in this example. Similarly, an adjusted position that is calculated to be less than 4 will be set to 4. The adjusted position is not allowed to fall below the lower limit of the range, which is 4 in this example.

Figure 14:
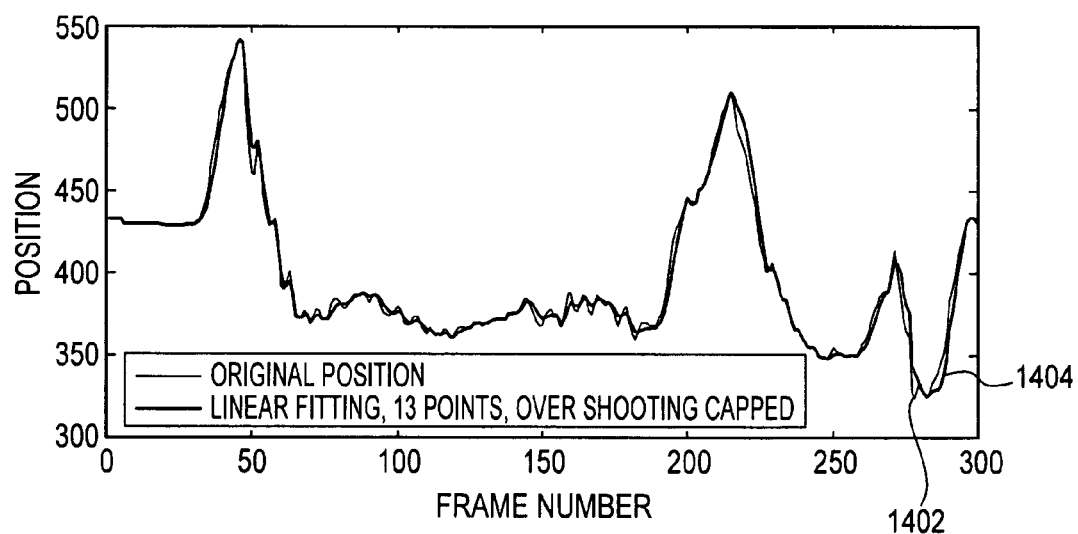
FIG. 14 shows an example polynomial fitted curve for which adjusted positions are limited within a range in accordance with an embodiment disclosed herein.

FIG. 14 shows an example polynomial fitted curve 1402 for which adjusted positions are limited within a range in accordance with an embodiment disclosed herein. In particular, curve 1402 is polynomial fitted as described with reference to FIG. 13 with the additional requirement that the adjusted position of the at least one pixel for each frame is limited within a range defined by the determined positions of the at least one pixel in the plurality of frames, which are used to calculate the adjusted position. Curve 1402 represents the original position curve before smoothing.

The adjusted positions of the at least one pixel in respective video frames may be calculated iteratively to generate any of the delayed smoothed position curves or polynomial fitted curves described herein. For instance, the plurality of positions used to calculate the adjusted position of the at least one pixel in one frame may be modified by including the next consecutive position and discarding the oldest position in the plurality of positions to calculate the adjusted position of the at least one pixel in the next consecutive frame. Such an iterative technique is illustrated in FIG. 15 with respect to the generation of a polynomial fitted curve.

Figure 15:
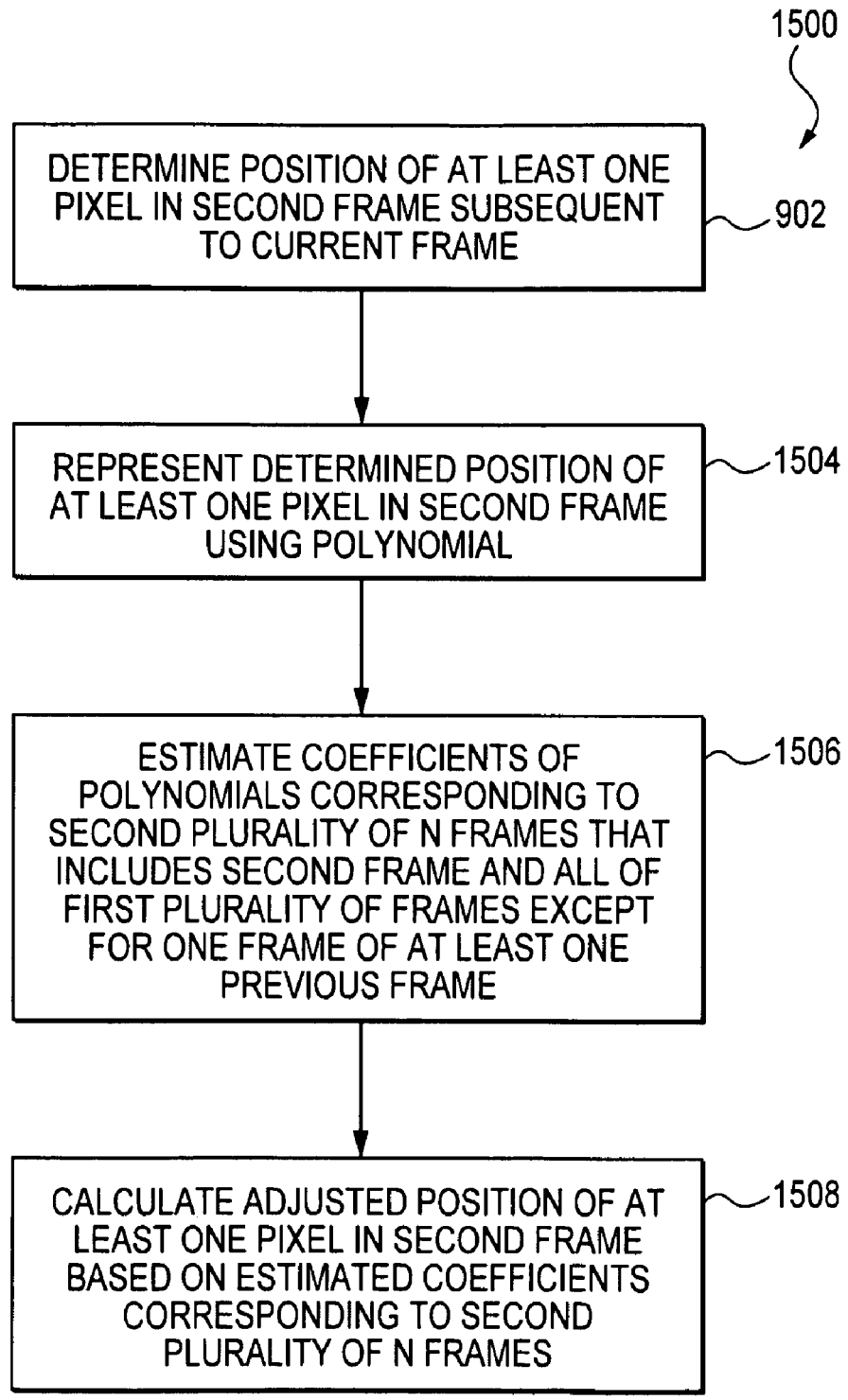

In FIG. 15, it is assumed that the first plurality of frames includes N frames for illustrative purposes. According to method 1500, at block 902, the position of the at least one pixel in a second frame that is subsequent to the current frame is determined. The determined position of the at least one pixel in the second frame is represented using a polynomial at block 1504. Coefficients of the polynomials corresponding to a second plurality of N frames is estimated at block 1506. The second plurality of N frames includes the second frame and all of the first plurality of frames except for one frame of the at least on e previous frame. An adjusted position of the at least one pixel in the second frame is calculated based on the estimated coefficients corresponding to the second plurality of frames at block 1508. The steps described above with reference to FIG. 15 may be repeated for each subsequent video frame to provide the respective adjusted positions necessary to generate the polynomial fitted curve. For instance, the frame corresponding to the most recently calculated adjusted position becomes the "current frame", and the next subsequent frame becomes the "second frame".

The second example embodiment and example variations set forth above provide relatively smooth transitions between respective positions of at least one pixel in adjacent video frames with an additional benefit that it is often characterized by less delay, as compared to other motion smoothing techniques.

The embodiments described herein are capable of smoothing motion in video without the need for a frame buffer, which offers the following advantages: fewer components, smaller size of the imaging device, lower cost, etc. The embodiments may limit the compensation value or adjustment associated with an adjusted position of the at least one pixel in a frame to avoid introducing blank areas at the edge(s) of the frames. The embodiments may limit overshoot associated with the smoothing operation by limiting the adjusted position of the at least one pixel within a range defined by the determined positions of the at least one pixel in the plurality of frames that is used to determine the adjusted position. The number of frames used to determine the adjusted position in a frame may depend upon the amount of compensation or adjustment calculated for the frame. For instance, fewer frames may be utilized to calculate the adjusted position of the at least one pixel in a frame if the compensation value or adjustment that is calculated using a greater number of frames exceeds a threshold. On the other hand, more frames may be utilized to calculate the adjusted position in some instances.

The first example embodiment, in which the position of the at least one pixel in the current frame is adjusted by combining a compensation value with the current position, and the second example embodiment, in which the position of the at least one pixel in the current frame is adjusted by utilizing a polynomial fitting technique, provide curves that differ with respect to delay and smoothness. For instance, a curve of the first example embodiment may be smoother but have more delay than a curve of the second embodiment, or vice versa. A variety of other factors may also affect delay and/or smoothness, including but not limited to the use of a compensation limit and/or an overshoot limit, the number of frames used to calculate the adjusted positions of the at least one pixel, etc. Moreover, the order of the polynomials used in the second example embodiment may affect the smoothness of the resulting curve. In the example illustrations provided herein, linear fitting appears to cause less delay than average filtering, but average filtering appears to smooth better than linear fitting. It should be noted, however, that these example illustrations are not intended to be limiting. The type of motion smoothing employed may depend upon the relative importance of one or more of these considerations, or other considerations not specifically mentioned herein.

Any of the methods described herein may be performed by any of a variety of devices and/or systems, including but not limited to the image processor 120 of FIG. 1, a central processing unit (CPU), a system as described below with reference to FIG. 16 or FIG. 17, or a component thereof.

Figure 16:
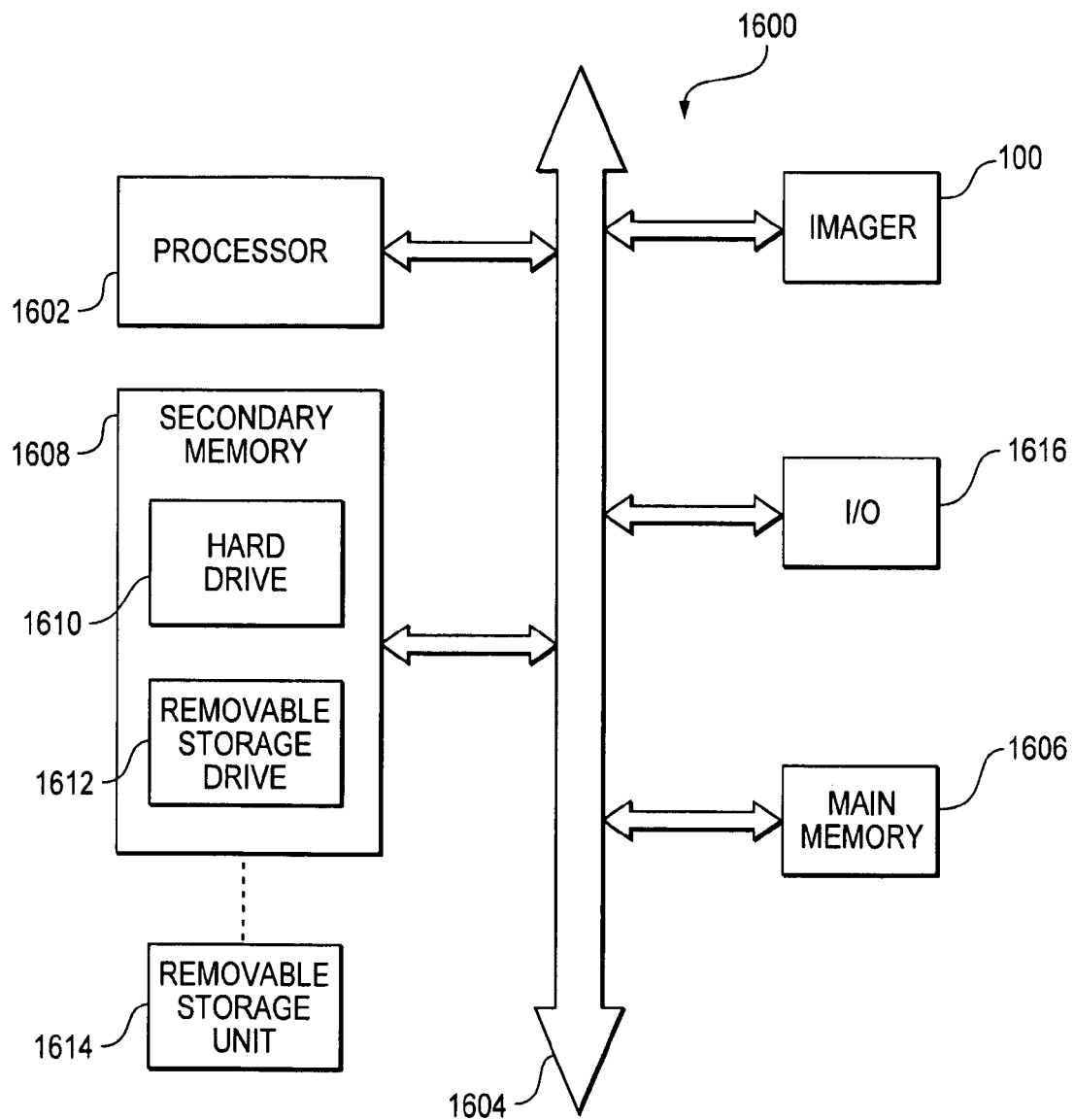
FIG. 16 is an example processor system that includes an imager in accordance with an embodiment disclosed herein.

FIG. 16 is a block diagram of an example processor system 1600 that includes an imager, such as imager 100 of FIG. 1, in accordance with an embodiment disclosed herein. System 1600 will be described with reference to imager 100 for convenience. System 1600 is capable of performing the motion smoothing techniques described herein. For example, the techniques may be performed exclusively by either imager 100 or system 1600, or may be shared among imager 100 and other components of processor system 1600. Without being limiting, processor system 1600 may include a computer system, camera system, scanner, machine vision, vehicle navigation, video phone, surveillance system, auto focus system, star tracker system, motion detection system, image stabilization system, data compression system, etc.

Referring to FIG. 16, imager 100 provides an image from a pixel array. System 1600 includes one or more processors, such as processor 1602, which are capable of processing the image. Processor 1602 may be any type of processor, including but not limited to a special purpose or a general purpose digital signal processor. The motion smoothing techniques described herein may be performed by processor 1602, image processor 120 of imager 100, or a combination thereof.

System 1600 also includes a main memory 1606, preferably random access memory (RAM), and may also include a secondary memory 1608. Secondary memory 1608 may include, for example, a hard disk drive 1610 and/or a removable storage drive 1612, representing a floppy disk drive, a magnetic tape drive, an optical disk drive, etc. Removable storage drive 1612 reads from and/or writes to a removable storage unit 1614 in a well known manner. Removable storage unit 1214 represents a floppy disk, magnetic tape, optical disk, etc. As will be appreciated, removable storage unit 1614 includes a computer usable storage medium having stored therein computer software and/or data.

Communication infrastructure 1604 (e.g., a bus or a network) facilitates communication among the components of processor system 1600. For example, imager 100, input/output (I/O) device 1616, main memory 1606, and/or secondary memory 1608 may communicate with processor 1602 or with each other via communication infrastructure 1604.

System 1600 may further include a display interface, which forwards graphics, text, and/or other data from communication infrastructure 1604 (or from a frame buffer not shown) for display on a display unit.

According to the embodiments described herein, imager 100 may be combined with a processor, such as a CPU, digital signal processor, or microprocessor, with or without memory storage on a single integrated circuit or on a different chip than the processor.

It will be recognized by persons skilled in the relevant art(s) that the motion smoothing techniques described herein may be implemented as control logic in hardware, firmware, or software or any combination thereof.

Figure 17:
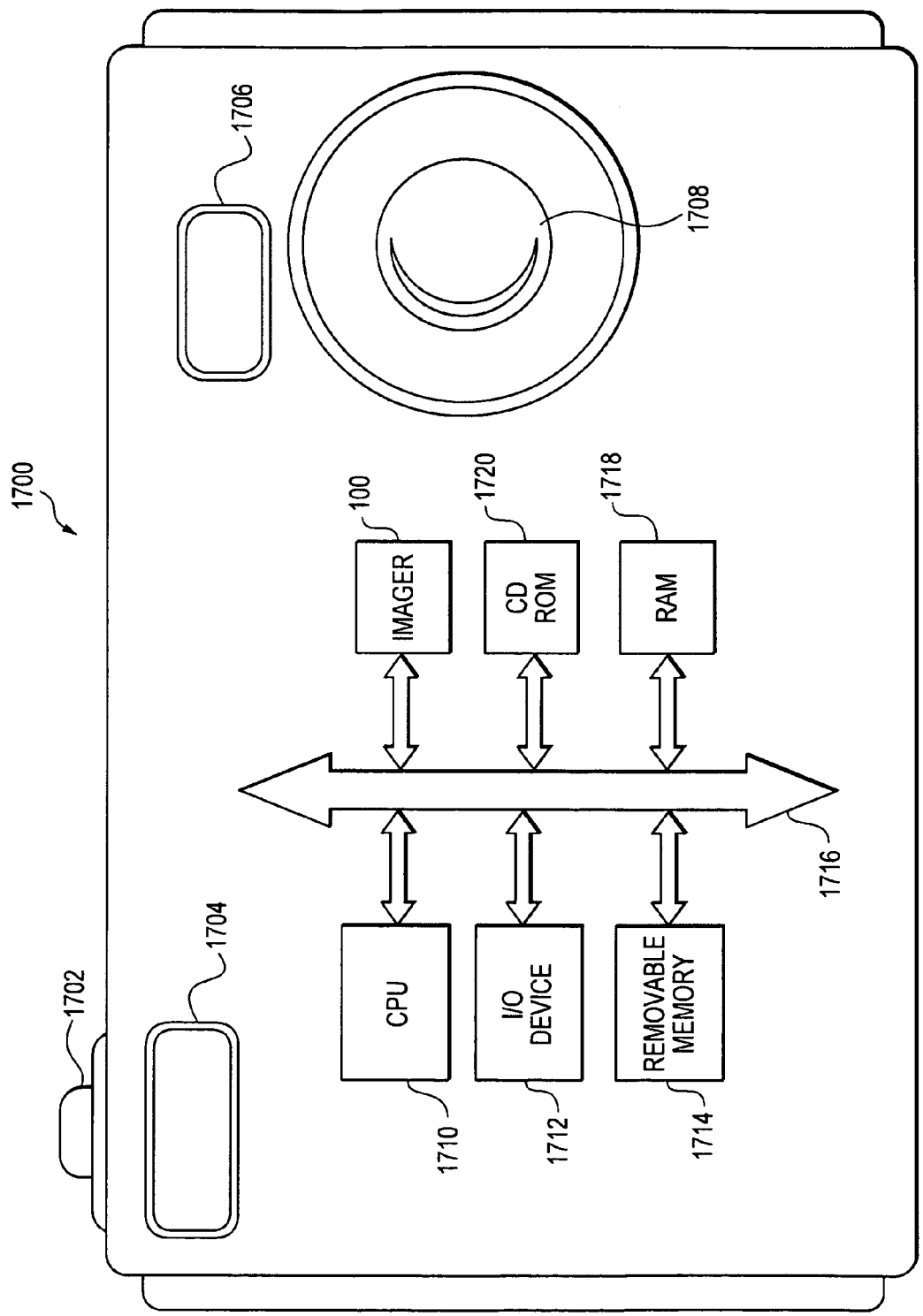
FIG. 17 is a block diagram of an image processing system, incorporating an imager in accordance with the method and apparatus embodiments described herein.

FIG. 17 is a block diagram of an image processing system, e.g., a camera system, 1700 incorporating an imager 100 in accordance with the method and apparatus embodiments described herein. In FIG. 17, imager 100 provides an image output signal as described above. A camera system 1700 generally includes a shutter release button 1702, a view finder 1704, a light source 1706 and a lens system 1708. A camera system 1700 generally also includes a camera control central processing unit (CPU) 1710, for example, a microprocessor, that communicates with one or more input/output (I/O) devices 1712 over a bus 1716. CPU 1710 also exchanges data with random access memory (RAM) 1718 over bus 1716, typically through a memory controller. A camera system 1700 may also include peripheral devices such as a removable flash memory 1720, which also communicates with CPU 1710 over bus 1716. System 1700 is capable of capturing video frames for processing in accordance with the motion smoothing techniques described herein. The motion smoothing techniques may be performed by CPU 1710, image processor 120 of imager 100, or a combination thereof.

Example embodiments of methods, systems, and components thereof have been described herein. As noted elsewhere, these example embodiments have been described for illustrative purposes only, and are not limiting. Other embodiments and modifications, though presently unforeseeable, of the embodiments described herein are possible and are covered by the invention. Such other embodiments and modifications will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed as new and desired to be protected by Letters Patent of the United States is:

1. A method comprising:
   determining, with an image processor, a position of at least one pixel in each of a first plurality of video frames that includes a current frame and at least one previous frame to provide respective determined positions; and
   calculating, with the image processor, an adjusted position of the at least one pixel in the current frame based on the determined positions, wherein the step of calculating the adjusted position includes calculating the adjusted position of the at least one pixel in the current frame having buffer pixels along edges of the current frame to accommodate a difference between the determined position in the current frame and the adjusted position.

2. The method of claim 1, further comprising:
   integrating, with the image processor, a motion curve for the at least one pixel corresponding to the first plurality of frames to provide a position curve that includes the position of the at least one pixel in each of the first plurality of frames;
   wherein the step of determining the position of the at least one pixel in each of the first plurality of frames is performed in response to the step of integrating the motion curve.

3. A method comprising:
   determining, with an image processor, a position of at least one pixel in each of a first plurality of video frames that includes a current frame and at least one previous frame to provide respective determined positions; and
   calculating, with the image processor, an adjusted position of the at least one pixel in the current frame based on the determined positions, wherein the step of calculating the adjusted position includes:
   averaging, with the image processor, the determined positions to provide an average position of the at least one pixel;
   calculating, with the image processor, a first compensation value based on a difference between a first determined position of the at least one pixel in the current frame and the average position; and
   combining, with the image processor, the first determined position with the first compensation value to provide the adjusted position.

4. The method of claim 3, wherein the first compensation value equals zero if the difference between the average position and the first determined position exceeds a predetermined threshold.

5. The method of claim 4, wherein the first compensation value equals the difference between the average position and the first determined position if the difference is less than the threshold.

6. The method of claim 3, wherein the first plurality of frames includes N frames, and wherein the method further comprises:
   averaging, with the image processor, determined positions of the at least one pixel in M corresponding frames of the first plurality of frames to provide a second average position in response to the first compensation value exceeding a predetermined threshold, wherein M<N, and wherein the M corresponding frames include the current frame; and recalculating, with the image processor, the first compensation value based on a difference between the second average position and the first determined position;
wherein combining the first determined position with the first compensation value is performed in response to recalculating the first compensation value.

7. The method of claim 6 further comprising:
determining, with the image processor, a position of the at least one pixel in a second frame subsequent to the current frame;
averaging, with the image processor, the determined positions of the at least one pixel in the frames of a second plurality of N frames that includes the second frame and all of the first plurality of frames except for one frame of the at least one previous frame to provide a third average position;
calculating, with the image processor, a second compensation value based on a difference between the third average position and the determined position of the at least one pixel in the second frame; and
combining, with the image processor, the second compensation value with the determined position of the at least one pixel in the second frame to provide an adjusted position of the at least one pixel in the second frame.

8. The method of claim 7, wherein the step of combining the second compensation value with the determined position to provide the adjusted position is performed in response to an absolute value of the second compensation value not exceeding the threshold and the absolute value of the second compensation value not exceeding an absolute value of the first compensation value.

9. The method of claim 6, further comprising:
averaging, with the image processor, determined positions of the at least one pixel in L corresponding frames of the first plurality of frames to provide a third average position in response to the recalculated first compensation value exceeding the threshold, wherein L<M, and wherein the L corresponding frames include the current frame; and
recalculating, with the image processor, the first compensation value based on a difference between the third average position and the first determined position;
wherein combining the first determined position with the first compensation value is performed in response to recalculating the first compensation value based on the difference between the third average position and the first determined position.

10. The method of claim 9, further comprising:
determining, with the image processor, a position of the at least one pixel in a second frame subsequent to the current frame;
averaging, with the image processor, the determined positions of the at least one pixel in the frames of a second plurality of M frames that includes the second frame and all but one of the M corresponding frames of the first plurality of frames to provide a fourth average position, the second plurality of M frames including the current frame;
calculating, with the image processor, a second compensation value based on a difference between the fourth average position and the determined position of the at least one pixel in the second frame; and
combining, with the image processor, the second compensation value with the determined position of the at least one pixel in the second frame to provide an adjusted position of the at least one pixel in the second frame.

11. The method of claim 10, wherein the step of combining the second compensation value with the determined position to provide the adjusted position is performed in response to an absolute value of the second compensation value not exceeding the threshold and the absolute value of the second compensation value not exceeding an absolute value of the first compensation value.

12. The method of claim 9, wherein N=9, M=7, and L=5.

13. The method of claim 9, further comprising the step of:
setting, with the image processor, the first compensation value equal to the threshold in response to the difference between the third average position and the first determined position exceeding the threshold;
wherein combining the first compensation value with the first determined position is performed in response to setting the first compensation value equal to the threshold.

14. A method comprising:
determining, with an image processor, a position of at least one pixel in each of a first plurality of video frames that includes a current frame and at least one previous frame to provide respective determined positions;
calculating, with the image processor, an adjusted position of the at least one pixel in the current frame based on the determined positions, wherein the step of calculating the adjusted position includes representing the determined positions using respective polynomials, estimating coefficients of the polynomials based on the determined positions, and calculating the adjusted position based on the estimated coefficients; and
smoothing motion between the current frame and the at least one previous frame for video stabilization by adjusting the position of the at least one pixel to the adjusted position.

15. The method of claim 14, wherein the polynomials are first-order polynomials.

16. The method of claim 14, wherein the polynomials are second-order polynomials.

17. The method of claim 14, wherein the step of estimating the coefficients is performed using a least squares fit technique.

18. The method of claim 14, wherein the step of calculating the adjusted position includes limiting the adjusted position within a range defined by the determined positions of the at least one pixel in the first plurality of frames.

19. The method of claim 14, wherein the first plurality of frames includes N frames, and wherein the method further comprises:
determining, with the image processor, a position of the at least one pixel in a second frame subsequent to the current frame;
representing, with the image processor, the determined position of the at least one pixel in the second frame using a polynomial;
estimating, with the image processor, coefficients of the polynomials corresponding to a second plurality of N frames that includes the second frame and all of the first plurality of frames except for one frame of the at least one previous frame; and
calculating, with the image processor, an adjusted position of the at least one pixel in the second frame based on the estimated coefficients corresponding to the second plurality of N frames.

20. An image processing apparatus comprising:
an image sensor for detecting an image and outputting image signals corresponding to the detected image; and an image processor for processing the image signals outputted from the image sensor, the image processor configured to perform a plurality of operations including:
- determining a position of at least one pixel in each of a first plurality of video frames that includes a current frame and at least one previous frame to provide respective determined positions;
- calculating an adjusted position of the at least one pixel in the current frame based on the determined positions;
- averaging the determined positions to provide an average position of the at least one pixel;
- calculating a first compensation value based on a difference between a first determined position of the at least one pixel in the current frame and the average position; and
- combining the first determined position with the first compensation value to provide the adjusted position.

21. An image processing apparatus comprising:
an image sensor for detecting an image and outputting image signals corresponding to the detected image; and
an image processor for processing the image signals outputted from the image sensor, the image processor configured to perform a plurality of operations including:
- determining a position of at least one pixel in each of a first plurality of video frames that includes a current frame and at least one previous frame to provide respective determined positions;
- calculating an adjusted position of the at least one pixel in the current frame based on the determined positions;
- representing the determined positions using respective polynomials;
- estimating coefficients of the polynomials based on the determined positions;
- calculating the adjusted position based on the estimated coefficients; and
- smoothing motion between the current frame and the at least one previous frame for video stabilization by adjusting the position of the at least one pixel to the adjusted position.

22. An image processing apparatus comprising:
an image sensor for detecting an image and outputting image signals corresponding to the detected image; and
an image processor for processing the image signals outputted from the image sensor, the image processor configured to perform a plurality of operations including:
- determining a position of at least one pixel in each of a first plurality of video frames that includes a current frame and at least one previous frame to provide respective determined positions; and
- calculating an adjusted position of the at least one pixel in the current frame based on the determined positions, wherein the image processing apparatus is part of a video camera.

23. A processing system, comprising:
a processor for receiving and processing frames of image data, said processor being configured to perform a plurality of operations including:
- determine a position of at least one pixel in each of a first plurality of video frames that consists of a current frame and at least one previous frame to provide respective determined positions,
- calculate an adjusted position of the at least one pixel in the current frame based on the determined positions,
- average the determined positions to provide an average position of the at least one pixel,
- calculate a first compensation value based on a difference between a first determined position of the at least one pixel in the current frame and the average position, and
- combine the first determined position with the first compensation value to provide the adjusted position.

24. A processing system, comprising:
a processor for receiving and processing frames of image data, said processor being configured to perform a plurality of operations including:
- determine a position of at least one pixel in each of a first plurality of video frames that consists of a current frame and at least one previous frame to provide respective determined positions;
- calculate an adjusted position of the at least one pixel in the current frame based on the determined positions;
- represent the determined positions using respective polynomials;
- estimate coefficients of the polynomials based on the determined positions; and
- calculate the adjusted position based on the estimated coefficients; and
- smooth motion between the current frame and the at least one previous frame for video stabilization by adjusting the position of the at least one pixel to the adjusted position.

* * * * *